United States Patent [19]

Tendler

[11] Patent Number: 5,187,978
[45] Date of Patent: Feb. 23, 1993

[54] KNOTMETER IMPELLER ELIMINATOR SYSTEM

[76] Inventor: Robert K. Tendler, 19 Lawrence Ave., Chestnut Hill, Mass. 02167

[21] Appl. No.: 713,789

[22] Filed: Jun. 12, 1991

[51] Int. Cl.$^5$ .............................................. G01C 21/10
[52] U.S. Cl. .................................. 73/187; 364/443; 364/566; 364/578
[58] Field of Search ............... 73/187, 861.79, 861.77, 73/861.78, 195, 196, 182; 364/443, 566, 578

[56] References Cited

U.S. PATENT DOCUMENTS

| | | | |
|---|---|---|---|
| 3,433,065 | 3/1969 | Mergler | 73/187 |
| 3,496,770 | 2/1970 | Fassett, II | 73/187 |
| 4,653,320 | 3/1987 | Laforge et al. | 73/187 |
| 4,676,097 | 6/1987 | Tusting | 73/187 |

*Primary Examiner*—Donald O. Woodiel
*Attorney, Agent, or Firm*—Robert K. Tendler

[57] ABSTRACT

A knotmeter impeller eliminator system is provided which includes a circuit that simulates the pulsed output of an impeller-type transducer system by generating pulses having a pulse repetition rate corresponding to speed, with the speed being derived from a navigation unit such as a LORAN, GPS, SAT/NAV or OMEGA unit which provides as an output thereof a standardized NMEA 0183 coded signal corresponding to calculated speed. In one embodiment, a switching system is provided which switches the knotmeter input between either the impeller output or the simulated output to provide a speed indication regardless of whether or not the impeller is jammed by seaweed, eel grass, or other debris. In one embodiment, the pulse generating system involves the utilization of a transistor, the base of which is controlled to turn the transistor on at a rate related to the calculated speed, with pulses to the base of the transistor being generated by a pulse generator which detects a digital signal representing calculated speed and produces a corresponding analog voltage that is in turn coupled to a voltage-controlled oscillator circuit. Alternatively, calculated speed may be transformed into the requisite number of pulses per second via an internal clock and count-down circuits within the CPU used to detect the NMEA 0183 speed sentence.

5 Claims, 4 Drawing Sheets

KNOTMETER IMPELLER ELIMINATOR SYSTEM

FIELD OF THE INVENTION

This invention relates to knotmeters for the sensing and display of boat speed and more particularly to a system which eliminates the problems associated with fouling or jamming of impellers utilized to sense boat speed.

BACKGROUND OF THE INVENTION

Knotmeters or knotlogs as they are sometimes called have been provided in the past in which water movement past an impeller provides a signal related to the impeller speed and thus the flow of water past the impeller. As is common, impeller speed may be readily converted into an indication of boat speed, either through the magnitude of a signal generated by a generator coupled to the impeller or by the number of pulses per second generated when a magnetic element in the impeller passes by a Hall effect transistor. In general, the latter type of knotmeter transducers generate between 17,000 and 24,000 pulses per knot.

One of the difficulties with the utilization of an impeller type knotmeter is that the impeller can become fouled both by barnacles and marine growth, but more importantly and more recently by eel grass, weeds, and in fact plastic bags and debris in the water. In the past the problems of fouling the impeller have been addressed through housings which permit the removal of the impeller portion of the sensing unit. At the same time it is necessary to simultaneously put a plug in the housing to stop the gush of water as the impeller element is removed from the housing since this housing is in the form of a conduit which passes through the hull of the boat. This of course is both time consuming, inconvenient, and sometimes dangerous in that if the plug is not properly positioned, the boat can sink. Invariably, however, the individual performing the cleaning operation gets soaking wet.

The frequency of clearing the impeller has increased in recent years such that on a given boat trip, the impeller may need to be cleaned under way as often as every three or four miles. This is an intolerable situation and one which renders the knotmeter useless for most of the time.

Additionally, for those boats utilizing transom mount transducers, the impeller may be damaged by virtue of a log or floating debris physically hitting the impeller and bending or damaging it so that it will no longer rotate. Moreover, for those transducers having a flip up capability, the knotmeter ceases to function when the transducer is flipped up, requiring reaching over the stern of the boat to flip the transducer down to its operating position.

All of the above militates against a properly functioning knotmeter. Additionally, speed through water is of course no indication of speed over the bottom.

SUMMARY OF THE INVENTION

As an alternative to utilizing the impeller-type transducer, the present system involves simulating the pulses produced by the Hall effect transistor through the utilization of calculated speed from a navigation unit such as a LORAN, GPS, SAT/NAV, OMEGA, or other type navigation unit. This speed information is currently available from the NMEA 0183 interface sentence structure, and as such means are provided to detect the coded speed signal and translate the detected speed into the appropriate number of pulses per second corresponding to the calculated speed. This is accomplished through the utilization of a pulse simulator circuit which includes a pulse generator that generates pulses equivalent to those produced by a Hall effect transistor which detects the rotation of the impeller. By merely switching the input to the knotmeter head or display from the impeller output to the simulated output, the impeller output is disengaged from the head and the head is then connected to the simulated output which is driven by the calculated speed from the navigation unit, unaffected by a fouled transducer.

While LORAN and OMEGA type navigation type units will work, their integration times are relatively slow such that the speed update may not be sufficiently fast. However, with the current GPS (Global Positioning Satellite) system, speed updates are available at as little an interval as six-tenths of a second. This provides for virtually instantaneous speed readings being available on the NMEA 0183 output of the navigation unit. Thus, with the utilization of GPS, the displayed speed can be made to respond sufficiently quickly to simulate the speed indication that would be available from an impeller-type system.

In one embodiment, an add-on switch/pulse generating unit is provided in which the output from the impeller and the output from the navigation unit are both connected to the switch/pulse generating unit. The switch is utilized to switch between which of the two speed sources is desired, with the output of the unit being coupled to the normal input for the knotmeter.

What is therefore provided is the self-same type of signal as that which is normally provided to the input of the knotmeter, such that the knotmeter can respond equally well to the output of the impeller or the output of the simulated pulse generator.

It will be appreciated that traditionally the electronics in the knotmeter senses the aforementioned pulsing through connection of the pulse detecting circuitry in the knotmeter to the collector of the Hall effect transistor. This collector is dragged low with each passage of the magnet past the Hall effect device. It is because the subject system produces signals of an identical type to those produced by the Hall effect device that it may be readily connected to existing knotmeters without change to the circuitry of the knotmeter itself.

While navigation units have been utilized to drive speed displays in self-contained units, these type systems do not generate a series of pulses corresponding to speed. Rather the information from the navigation unit is used directly to drive the speed display.

On the other hand, the subject system generates signals identical to those produced by the impeller-type speed detectors, thus permitting adaptability to existing knotmeters, the majority of which function on the above-mentioned principle.

In summary, a knotmeter impeller eliminator system is provided which includes a circuit that simulates the pulsed output of the impeller transducer system by generating pulses having a pulse repetition rate corresponding to speed, with the speed being derived from a navigation unit such as a LORAN, GPS, SAT/NAV or OMEGA unit which provides as an output thereof a standardized NMEA 0183 coded signal corresponding to calculated speed. In one embodiment, a switching system is provided which switches the knotmeter input between either the impeller output or the simulated output to provide a speed indication regardless of whether or not the impeller is jammed by seaweed, eel grass, or other debris. In one embodiment, the pulse generating system involves the utilization of a transistor, the base of which is controlled to turn the transistor on at a rate related to the calculated speed, with pulses to the base of the transistor being generated by a pulse generator which detects a digital signal representing calculated speed and produces a corresponding analog voltage that is in turn coupled to a voltage-controlled oscillator circuit. Alternatively, calculated speed may be transformed into the requisite number of pulses per second via an internal clock and count-down circuits within the CPU used to detect the NMEA 0183 speed sentence. This system can also be used to drive analog pointer-type knotmeters by coupling the above analog voltage as an input to the analog knotmeter.

BRIEF DESCRIPTION OF THE DRAWINGS

These and other features of the subject invention will be better understood in conjunction with the Detailed Description taken in conjunction with the Drawings of which:

FIG. 2 is a diagrammatic illustration of the utilization of a paddle wheel-type impeller on a vessel indicating fouling of the impeller through eel grass or the like;

DETAILED DESCRIPTION

Figure 1:
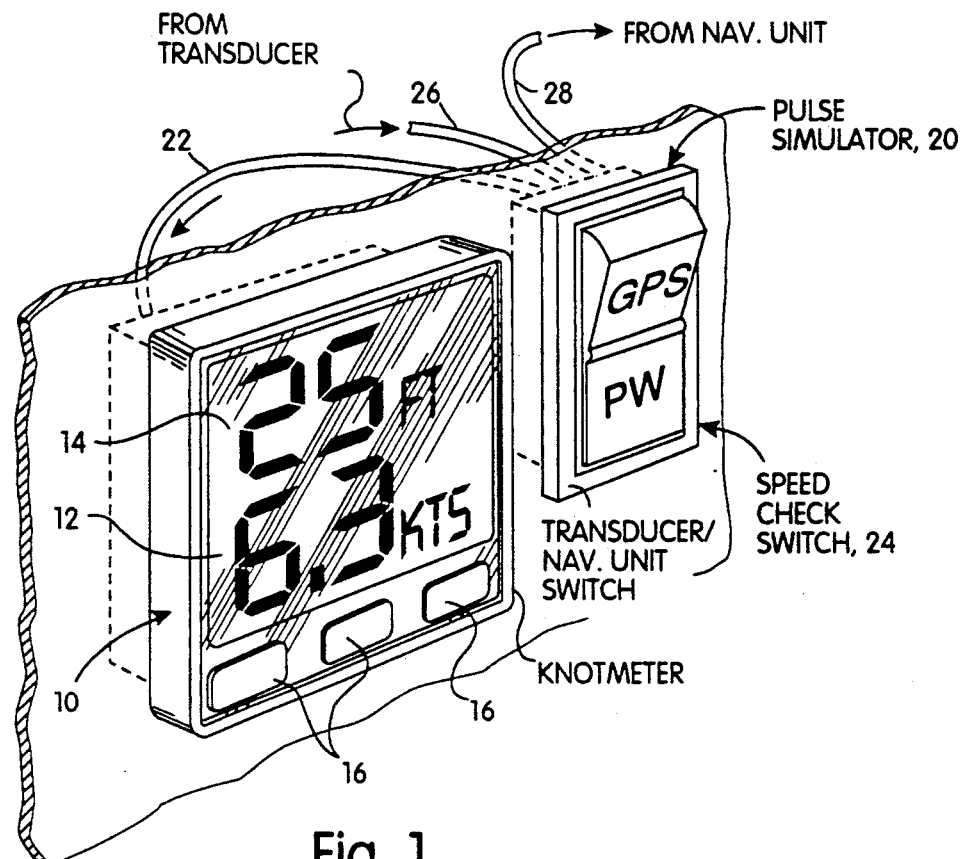
FIG. 1 is a diagrammatic representation of a knotmeter head adjacent a speed check switch, the inputs to which are from the impeller-type transducer and a navigational unit, with the output thereof being utilized as the speed input to the knotmeter.

Referring to FIG. 1, in a typical situation a bulk head mounted knotmeter 10 provides not only speed in knots as indicated by reference character 12 but also, in certain circumstances depth as well is indicated as shown at 14. Additionally, with appropriate actuation of switches 16, the knotmeter may be utilized to indicate temperature as well, with all of the depth speed and temperature information coming from a so-called triducer. The triducer includes a single unit housing, a depth sounding element, a temperature sensing element, and an impeller-type speed sensing element.

As mentioned hereinbefore, with respect to speed sensing, the impeller generally utilized for such purposes produces a number of pulses per knot, generally on the order of 17,000 pulses to 24,000 pulses per knot. These pulses are transmitted back to the knotmeter via a transmission cable which, inter alia, usually includes depth sounding cabling as well as temperature cabling.

When the impeller becomes jammed, it cannot rotate and therefore pulses cannot be generated. The result is that the knotmeter reads zero, a condition which is both annoying and sometimes dangerous. It has been found that the jamming of the impeller occurs with alarming frequency due to the fouling of coastal waters, as well as waters many many miles offshore. In fact the fouling of the oceans has become quite a concern because of non-biodegradable material dumped into the ocean including plastic containers, bags, and alike. This debris can be found virtually anywhere between the americas and either Africa or the European continent.

In order to either check the knotmeter for accuracy or to permit knotmeter readings with a fouled impeller, in the subject system a pulse simulator 20 is utilized to provide pulses over the knotmeter input cable 22 to the knotmeter by virtue of actuation of speed check switch 24 from its illustrated paddle wheel (PW) position to its indicated GPS position. In such a position, if pulse simulator 20 is connected to a GPS-type navigation unit having NMEA 0183 output, the decoded speed available from the NMEA 0183 sentence is transformed by the pulse simulator into a number of pulses corresponding to the decoded speed. These pulses are, as mentioned before, identical in format to those which would be produced by the impeller-type transducer over cable 26 and are transmitted to speed check switch 24 over cable 28.

The result of simulating pulses from a transducer of a paddle wheel or impeller-type permits speed readings to be taken regardless of the condition of the impeller of the transducer.

Moreover, in setting the knotmeter itself when first utilizing it with the transducer, it is oftentimes convenient to have a reference from which to set the knotmeter. Assuming zero current, one can therefore switch between the navigation unit detected speed and the transducer detected speed so that the knotmeter can be initially adjusted, as is usually required when installing a new knotmeter.

Figure 2:
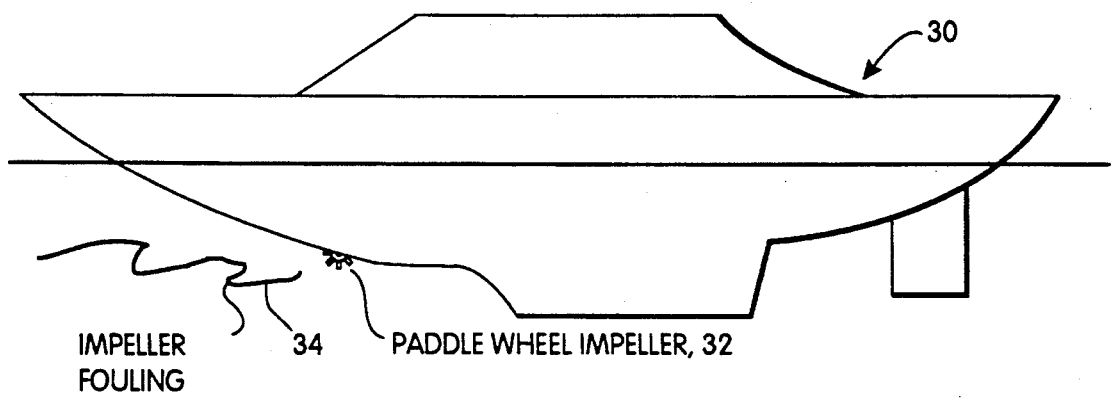

Referring now to FIG. 2, a vessel 30 is generally indicated as having a paddle wheel impeller-type transducer 32 which is fouled in the illustrated embodiment by long strands of eel grass 34, rubber bands, plastic bags, or other non-biodegradable substances which, as described before, can occur as often as every several miles during a slow speed trip or even on the mooring when fouling material passes by and gets caught in the impeller.

Figure 3:
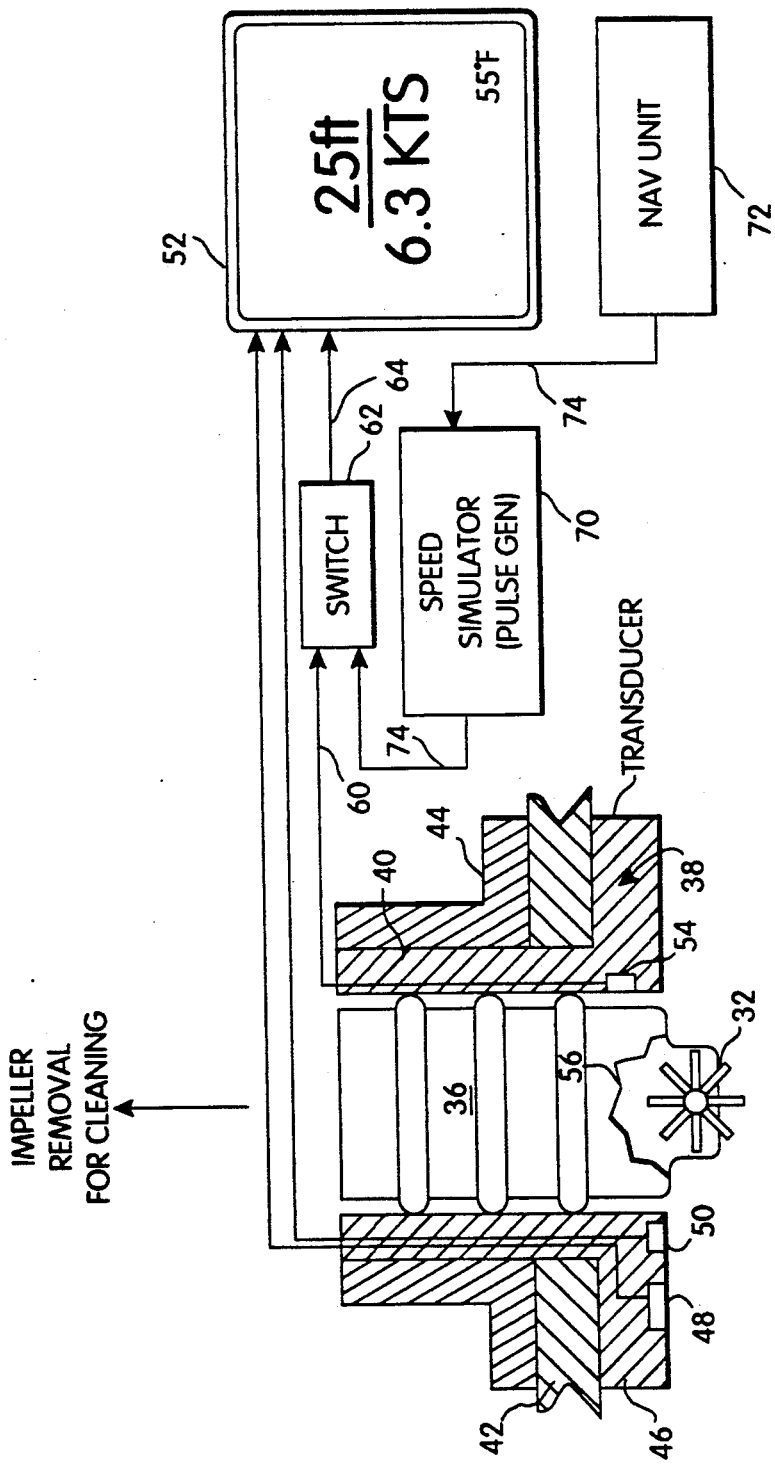
FIG. 3 is a schematic and block diagram of the subject system illustrating switching from impeller input to simulated pulse generator input for the knotmeter.

Referring to FIG. 3, impeller 32 is shown within a removable housing 36 which is located in a transducer head 38 having a cylindrical extension 40 which projects through hull 42 and is secured to the hull via flanges 44 and 46. The transducer shown is in the form of a triducer having a depth-sounding element 48 and a temperature-sensing element 50 coupled, as illustrated, to the depth sounder/knotmeter/temperature sensing head 52.

The impeller speed is detected by a Hall effect transducer assembly 54 which senses when a magnetic element 56 on the impeller passes close to it. The output of the Hall effect transistor system is a series of pulses delivered along line 60, in this case to a switch 62 and thence as an input 64 to knotmeter head 52.

As will be discussed, the pulses are generated through the grounding of a line from the knotmeter head to the Hall effect transducer circuit. The repetitious grounding of this line constitutes the generation of pulses for a large variety of knotmeters.

Figure 6:
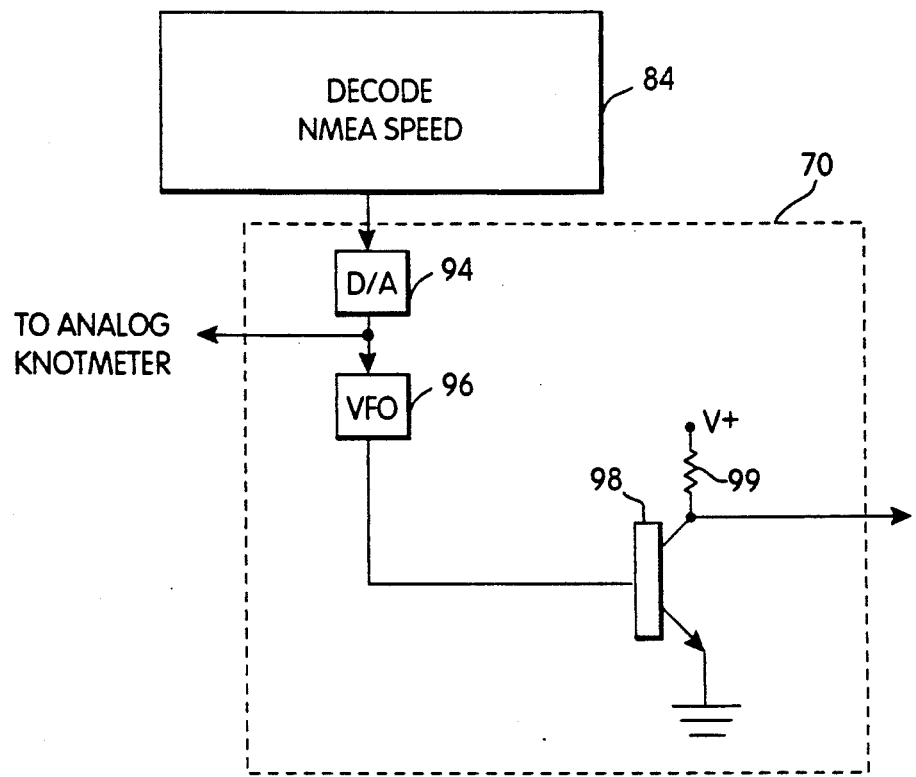
FIG. 6 is a block diagram of one embodiment of the simulated pulse generator, including a digital to analog converter and a variable frequency oscillator, the frequency of which is determined by an analog signal from the digital to analog converter.

It is the purpose of this invention to provide a speed simulating pulse generator 70 which detects or decodes a calculated speed from a navigation unit 72 via an NMEA 0183 link 74 which, as part of the NMEA 0183 format provides a standard speed sentence capable of being decoded into a digital number. The digital number is then converted into a series of pulses having a repetition rate proportional to the decoded speed. Note, that the standard NMEA 0183 speed sentence is readily decodable into a number representing the calculated speed. As will be seen, this number can be readily converted to an analog signal used to control a pulse generator for providing a pulse train, with the number of pulses per minute corresponding to decoded calculated speed. How this pulse train can be generated is illustrated in FIG. 6. Note, the output of the speed simulator 70 is provided over line 74 to switch 62, from whence it can be switched as an alternative output to knotmeter head 52.

Figure 4:
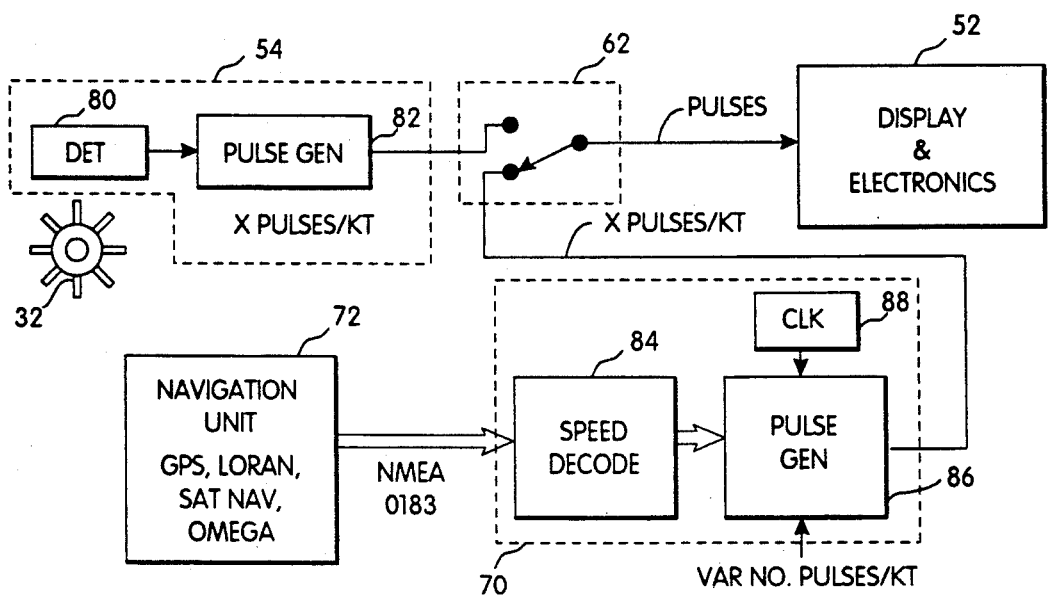
FIG. 4 is a block diagram of the subject system illustrating speed decoding from the navigation unit and a variable pulse generator utilized to match the pulses per knot output of the simulator to that associated with the impeller transducer system.

Referring to FIG. 4, speed detecting head 54 may include a paddle wheel or impeller speed detector 80 such as Sprague Electric Model UGN 3140 which is coupled to a suitable pulse generator 82. This pulse generator may be in the form of a simple emitter-grounded transistor, the output characteristic of which is to produce a given number of pulses per knot.

More particularly, pulse simulator 70 is provided with a speed decoding circuit 84 coupled to a pulse-generating circuit 86 having a pulse/knot characteristic adjustable to be identical to that associated with impeller-coupled pulse generator 82. To accomplish this, a clock 88 is coupled to pulse generator 86, with the clock being variable at least to the extent of being able to permit matching a pulse/knot characteristic of pulse generator 86 to that of pulse generator 82.

What can therefore be seen is that the pulse simulator portion of the subject invention can be adjusted so as to simulate both in format and in terms of numbers of pulses per knot that characteristic of the signal generated from the impeller-type transducer.

Figure 5:
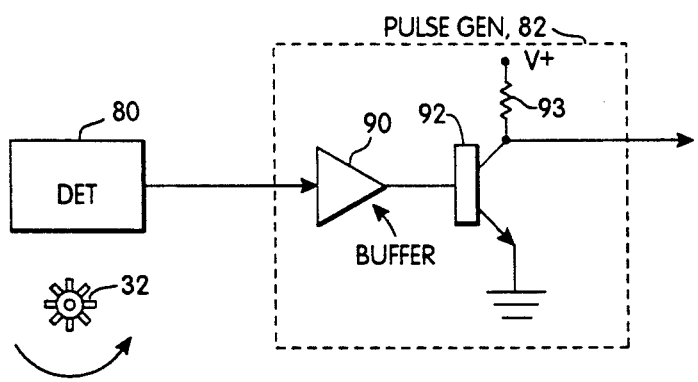
FIG. 5 is a block diagram of a prior art system for generating pulses which are transmitted back to the knotmeter head.

Referring to FIG. 5, as is common with a great number of knotmeters, detector 80 has an output which is applied to an optional buffering circuit 90, the output of which is applied to the base of a transistor 92, having its emitter grounded and its collector connector back to the knotmeter head, with voltage supplied to the collector through resistor 93. It is this type of simple system which is commonly used so that the knotmeter can detect the speed of impeller 32.

Referring now to FIG. 6 in the subject system, speed decoder 84 has an output which is applied to a digital to analog converter 94 to produce an analog signal voltage corresponding to decoded calculated speed from the navigation unit. This voltage is in turn coupled to a variable frequency oscillator 96 having a pulsed output which is coupled to the base of transistor 98 powered through resistor 99. Here transistor 98 may be made identical to the transistor illustrated in FIG. 5, with the resultant signals being identical at least in terms of what appears on the collector to these transistors. It will be appreciated that once having decoded a speed sentence into a number, software can be utilized to directly convert this number into an appropriate pulse train.

It will also be appreciated that one can utilize the output of the digital to analog converter 94 to supply an analog voltage to an analog, pointer-type knotmeter which responds in general to the magnitude of a voltage applied to the input terminal thereof. These types of knotmeters are well known. In general, the input to the knotmeter is connected to an analog signal produced by a generator coupled to the impeller; with the generator producing a signal having an amplitude proportional to the speed of the impeller. These type knotmeters also suffer from the same type of fouling as to the digital knotmeters described above.

It is therefore important to note that the subject system may be utilized to generate an analog signal corresponding in amplitude to decoded calculated speed, as well as the digital approach which results in the generation of pulses.

Figure 7:
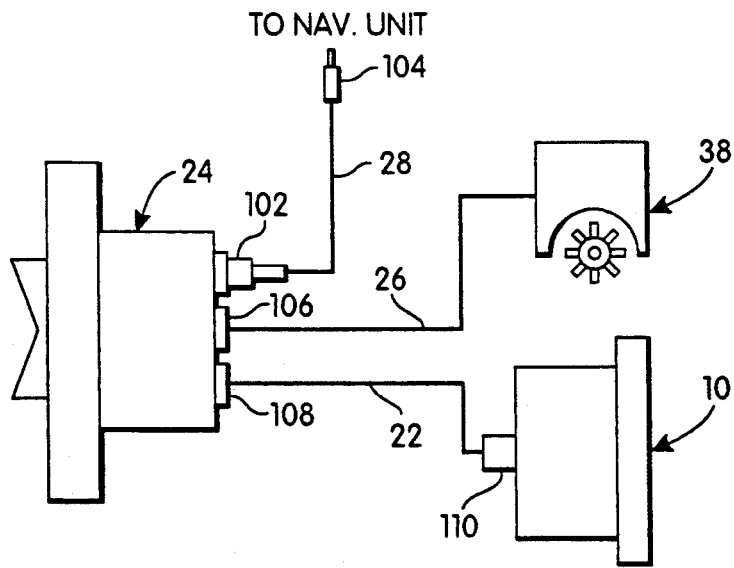
FIG. 7 is a block diagram of the wiring of the switch of FIG. 1 to the transducer, the pulse simulator, and the knotmeter.

Referring now to FIG. 7, switch 24 is illustrated as being connected to a navigation unit through a patch cord 28 that has a standard BNC connector 102 on one end and a connector 104 at the other end adapted to fit a particular navigation unit. Switch 24 is provided with connectors 106 and 108 adapted to accommodate the existing transducer and knotmeter which has an input connector 110. In general, connector 106 is made identical to connector 110 to minimize connector problems in adapting existing units.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a knotmeter which is adapted to receive a pulsed input from an impeller-type transducer, a system for providing an input to said knotmeter utilizing the output of a navigation unit having as an output thereof a digitally encoded signal corresponding to calculated speed comprising:

means adapted to be coupled to said navigation unit for decoding said digitally encoded signal and for generating pulses at a rate proportional to decoded speed as an output thereof; and, means for coupling said pulses to the input of said knotmeter.

2. The system of claim 1 and further including an impeller-type transducer for generating a predetermined number of pulses per knot as an output thereof and means for switching the input of said knotmeter between the outputs of said pulse generating means and said transducer.

3. The system of claim 2 and further including means for adjusting the pulse/knot characteristic of said pulse generating means to match that of said transducer.

4. The system of claim 1 wherein said decoding means includes means for converting said decoded digital signal into a digital signal representing a number corresponding to decoded speed, and wherein said pulse generating means includes a digital to analog converter coupled to said digital signal for generating a voltage corresponding decoded speed, and a voltage controlled oscillator coupled to the output of said digital to analog converter for producing a pulse stream having a pulse rate corresponding to said voltage and thus to decoded speed.

5. A system for use with a navigation unit which provides as an output a digital signal in the form of a speed sentence corresponding to calculated speed for providing a knotmeter with an input pulse train having pulses representing calculated speed by the pulse rate thereof, comprising:

means coupled to said digital signal for generating a pulse train that simulates the pulsed response of an impeller-type speed transducer responsive to water flow; and, means for coupling said pulse train to the input of said knotmeter.

* * * * *